Figure 1:
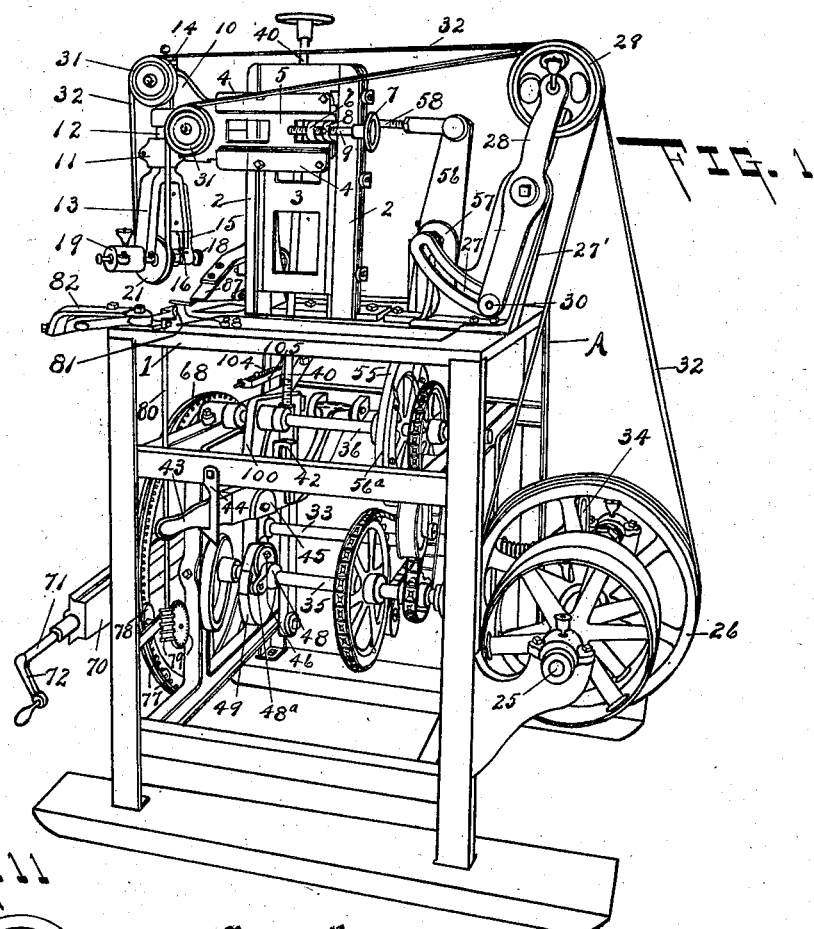

No. 867,723. PATENTED OCT. 8, 1907.
J. P. HEDSTROM.
MACHINE FOR SHARPENING SAW TEETH.
APPLICATION FILED APR. 26, 1906.

4 SHEETS—SHEET 1.

WITNESSES:
L. H. Marshall
C. R. Wallis

INVENTOR
John P. Hedstrom
BY
Geo. B. Willcox
ATTORNEY.

No. 867,723. PATENTED OCT. 8, 1907.
J. P. HEDSTROM.
MACHINE FOR SHARPENING SAW TEETH.
APPLICATION FILED APR. 26, 1906.
4 SHEETS—SHEET 2.
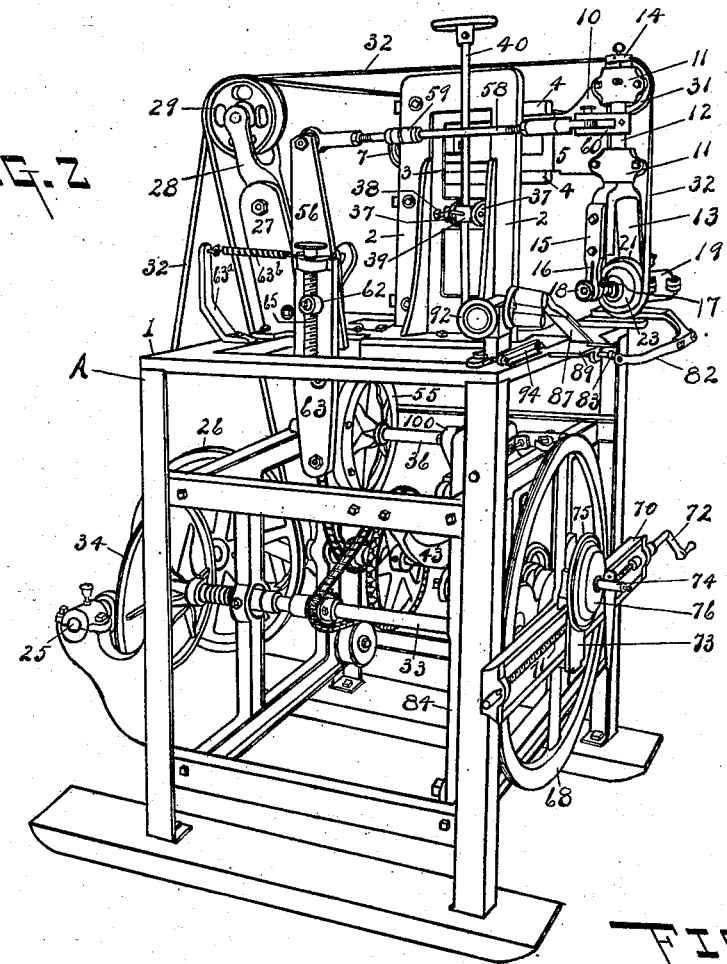
WITNESSES:
L. H. Marshall.
C. R. Wallis
INVENTOR
John P. Hedstrom
BY
Geo. B. Willcox
ATTORNEY

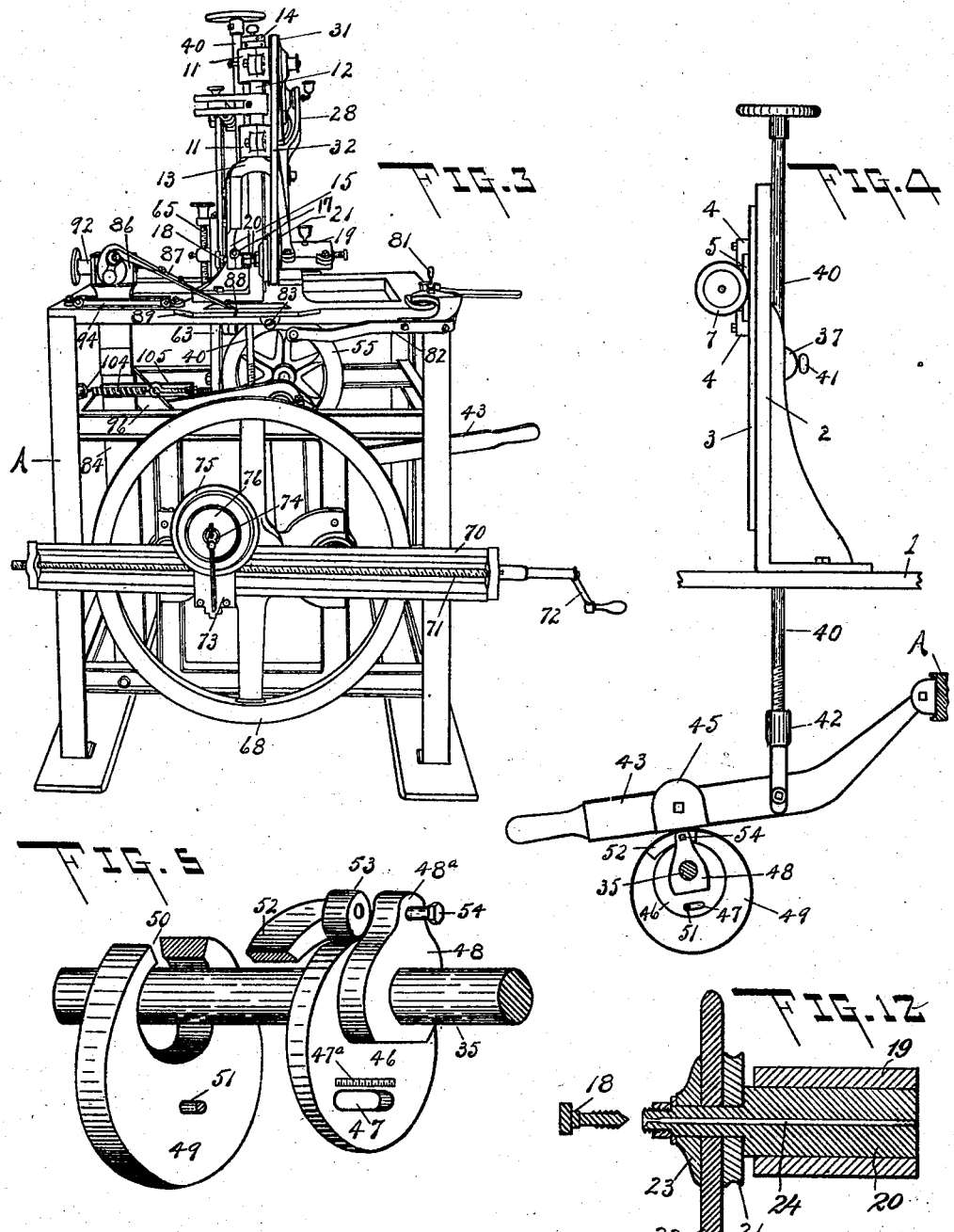

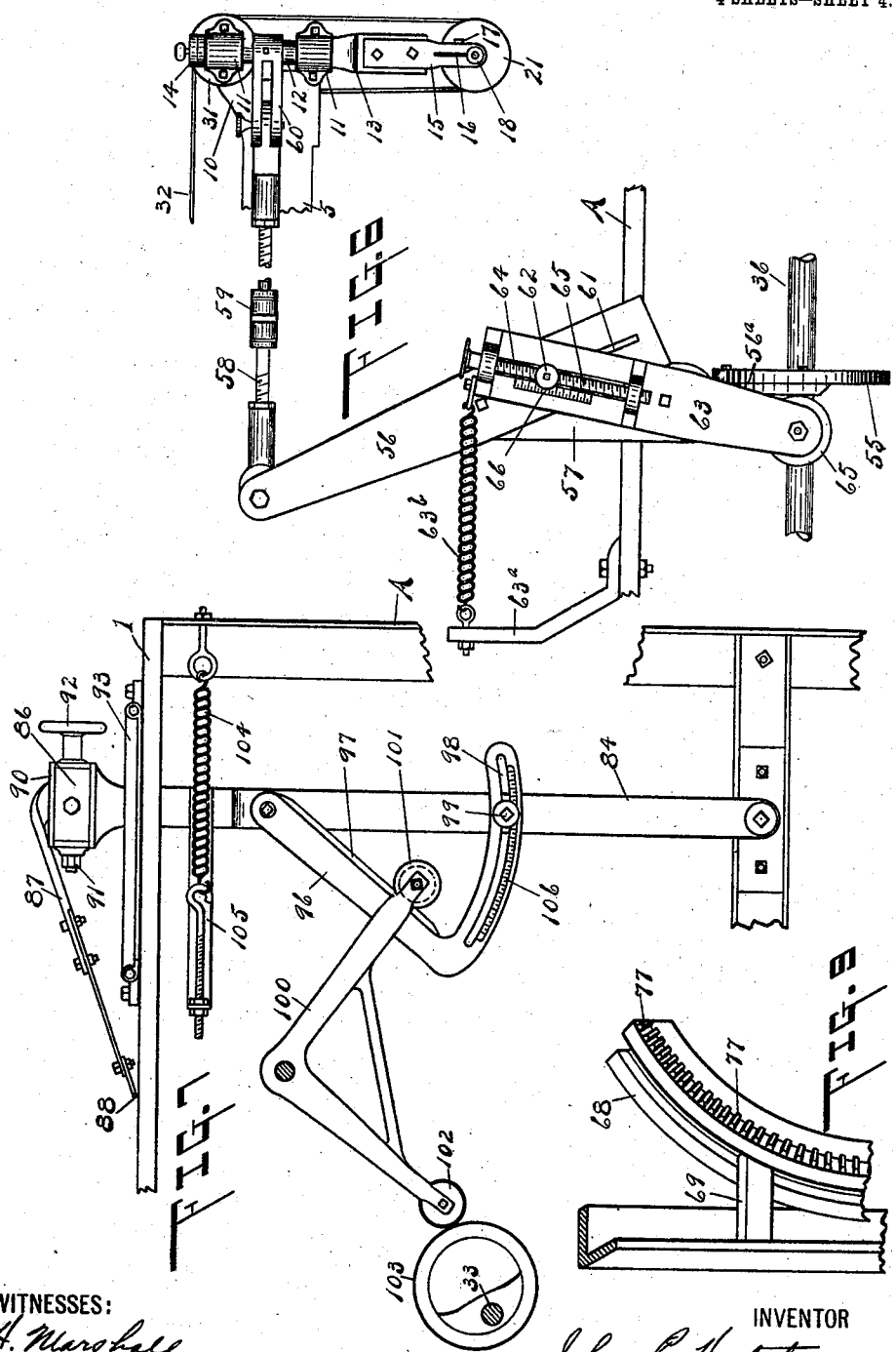

UNITED STATES PATENT OFFICE.

JOHN PATRICK HEDSTROM, OF BIG RAPIDS, MICHIGAN, ASSIGNOR TO VOLNEY H. HANCHETT AND ARTHUR K. HANCHETT, COMPOSING THE FIRM OF HANCHETT SWAGE WORKS, OF BIG RAPIDS, MICHIGAN.

MACHINE FOR SHARPENING SAW-TEETH.

No. 867,723.　　　Specification of Letters Patent.　　　Patented Oct. 8, 1907.

Application filed April 26, 1906. Serial No. 313,823.

*To all whom it may concern:*

Be it known that I, JOHN PATRICK HEDSTROM, a citizen of the United States, residing at Big Rapids, in the county of Mecosta and State of Michigan, have invented certain new and useful Improvements in Machines for Sharpening Saw-Teeth; and I do hereby declare the following to be a full, clear, and exact description of the invention, such as will enable others skilled in the art to which it appertains to make and use the same.

My invention relates to saw sharpening machines, and the present embodiment of my invention discloses an automatic machine of this character for sharpening the teeth of circular rip and crosscut saws, as well as shaping the teeth.

One of the objects of my invention is the provision of means for lessening or entirely removing the vibration and noise hitherto incident to the operation of this class of machinery, by the use of a friction feed, which also admits of a wide range of the time of the feed strokes.

Another object is the provision of means for effecting an even division of the pull which is distributed equally to the arbor on both sides of the emery wheel carried thereby. Hitherto the pull of the belt has been unevenly distributed so that the arbor on one side of the emery wheel received more than that portion of the arbor on the opposite side of the emery wheel, thereby making a perfect center bearing impossible. With my invention a perfect center bearing is assured, thus constantly maintaining the emery wheel in proper position for sharpening, and also, I provide means in this connection for taking up wear so that the wheel will grind evenly.

A further object of my invention is the provision of novel means for universally adjusting the saw, whereby the saw itself remains fast to the adjusting mechanism.

Another object of my invention is the provision of means for effecting a practically universal adjustment of the grinding mechanism.

A further object is the provision of means for effecting an automatic twist of the grinding mechanism, as when operating on crosscut saws, for instance, and for beveling the teeth.

A still further object is the provision of a novel means for imparting a reciprocatory motion to the grinding mechanism.

Another object is the provision of a novel and adjustable means for feeding the saw relative to the grinding mechanism. And a further object is the provision of a single means whereby the machine can be easily and quickly adjusted to any form of tooth desired.

To these ends my invention comprises certain novel features and combinations thereof or their equivalents, all of which will be more fully described hereinafter and particularly pointed out in the claims.

Figure 11:
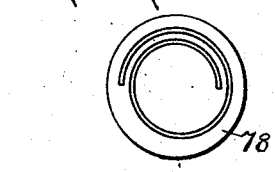
Figure 10:
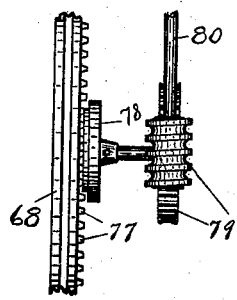

In the accompanying drawing, Figure 1 is a perspective view of one embodiment of my invention showing one side of a machine for sharpening saw teeth, Fig. 2 is a similar view showing the opposite side of the machine, Fig. 3 is an end view thereof, Fig. 4 is a detail view of a means for imparting a reciprocatory movement to the grinding mechanism, Fig. 5 is a detail view of the cam and its connected parts disassembled, Fig. 6 is a detail view of a mechanism for automatically imparting a twisting movement to the grinding mechanism, Fig. 7 is a detail view of a feeding mechanism, Fig. 8 is a detail view of an adjusting frame for the feed mechanism, Fig. 9 is a detail view of one means for retaining the saw carrier in alinement, Fig. 10 is a detail view of one means for rotating or adjusting the position of the saw carrier and Fig. 11 is a detail view of a scroll adapted to engage the saw carrier, and Fig. 12 is a detail view of the emery wheel spindle.

It is obvious that my invention might be embodied in various mechanisms and it should be understood that the following description and accompanying drawings merely illustrate one of the preferred forms which my invention is capable of assuming.

A indicates the frame of a machine comprising suitable legs, cross braces, and a skeleton table 1, the latter carrying the suitably strengthened vertically extending standards 2 2, in which is slidingly mounted the sash 3 supporting the grinding mechanism. The sash carries the horizontally extending ways 4 4, between which the slide or head 5 is received and supported, the slide being apertured to receive a lug 6 projecting from the sash, and supporting an adjusting screw 7 which engages with an ear 8 mounted on the slide and provided with a set screw 9, the ear being preferably in alinement with the lug. The screw is rotatably supported in the lug but is not movable longitudinally relative thereto. Rotation of the adjusting screw will cause the ear to travel toward one end or the other and thus move the slide in or out, the set screw operating to lock the parts against accidental displacement after the adjustment has been secured.

While I have described and illustrated the above means for effecting an adjustment of the slide which supports the grinding mechanism, it is obvious that other adjustments might be used without affecting the merits of the invention.

The forward end of the slide or head overhangs the table and terminates in a yoke 10, the arms of which are provided with alined bearings 11 11 to receive the stem 12 of a forked hanger 13 which depends beneath the yoke, the upper end of the stem carrying lock nuts 14 which rest upon the yoke and retain the stem in the bearings. One arm 15 of the forked hanger is removable and is preferably split at its lower end as at 16, a screw 17 connecting the split portions. Passing through a threaded aperture in the lower end of the split arm is an end-bearing screw 18 having its inner end tempered extremely hard to serve as a bearing for the arbor carrying the cutting member, the screw 17 permitting or preventing an adjustment of the bearing screw, by forcing the split portions of the arm apart or drawing them together to tightly grip the screw. The opposite arm of the hanger is provided with an offset journal bearing 19 in which is received the arbor or spindle 20, one end of which protrudes from the inner end of the journal bearing and receives the pulley 21, the emery wheel 22 and the lock plate 23, all of which are held in place tightly against the shoulder of the arbor by means of a nut. The extreme inner end of the arbor is recessed to receive and conform to the conical end of the bearing screw 18, the arbor having an oil duct 24 formed longitudinally thereof and closed at its outer end by a removable screw, for instance, to lubricate the end bearing.

It will be observed that the greater portion of the arbor is received in the offset journal bearing and that the pulley 21 is located in close proximity to the bearing and to the stationary arm of the forked hanger to the end that the tension of the belt passing over the pulley cannot effect that side of the arbor to a greater extent than it does the opposite side of the arbor, the offset journal bearing containing the major portion of the arbor so that the emery wheel and pulley are all located at the inner reduced end of the arbor and the bearing portion of the arbor, which is longer than the reduced portion, will prevent the tension from springing the arbor off center. The removable arm admits of the rapid and easy replacing and renewal of emery wheels.

A power shaft 25 is suitably journaled to the frame near the lower end preferably, and has mounted thereon a pulley 26. Projecting upward from the table is a bracket 27' having an arc shaped slot 27 formed therein near its foot, and pivoted intermediate its ends to the upper end of this bracket is a lever 28, the upper end of which carries an idle pulley 29 and the lower end of which lever is provided with a laterally extending pin 30 received and moving in the slot 27. A pair of idle pulleys (31 31) is mounted on the yoke and a belt 32 passes around the drive pulley 26, over the idle pulleys 29 and 31 31 and around the pulley 21 on the arbor 20, which is rotated at a high rate of speed owing to the relative diameters of the drive pulley and the pulley 21. The sash is raised and lowered during the rotation of the arbor and emery wheel and in order to hold the belt 32 tight on the pulley 21 the idle pulley 29 is pivotally mounted in order that it may rock forward as the emery wheel descends and backward as it ascends, the lever 28 being guided by the engagement of the pin 30 and slot 27. Thus the lever 28 and pulley 29 serve as a belt tightener. This is of course but one of many forms which might be used, and I have merely described and illustrated a convenient structure. The lever (28) is so pivoted to the bracket (27') as to normally maintain an inclined position similar to that shown in the drawings, it being free to swing forwardly under the tension of the belt and reassuming its normal position by gravity, the upper end of the lever over-weighting the lower end.

A drive shaft 33 is journaled in the frame and is actuated by means of a friction gear 34 from the power shaft 25. The drive shaft in turn transmits motion to a counter shaft 35 also journaled in the frame, the counter shaft being given a slower relative movement than the drive shaft and in turn adapted to rotate a driven shaft 36 at a less rate of speed.

The use of the friction drive 34 obviates the noise and vibration incident to a gear drive and also admits of a variety of adjustments to regulate the relative speeds of the shafts easily and quickly to attain any desired number of strokes of the moving parts, whereas the old machines of this type admit of only two adjustments and impart undesirable vibration to the machine as well as creating considerable noise. My invention further decreases the noise by the employment of the belt drive 32.

As one means for imparting a reciprocatory movement to the sash, I have disclosed the following construction embodying one form of my invention.

Projecting outward from one side of the sash are a pair of ears 37 37 between which is pivotally supported by means of a pivot screw 38, a perforated block 39, a rod 40 passing through the perforation in the block, which latter is adjustably secured to the rod by means of a set screw 41 for instance, the rod or post projecting some distance above and below the block to admit of a wide range of adjustment. It is obvious that the rod sustains and actuates the sash, the lower end of the rod being preferably threaded into a link 42 which latter is pivotally connected to a hand lever 43 pivotally secured at one end to the frame, the lever extending across the vertical plane of the countershaft, the opposite free end of the lever being normally supported by a hook 44 depending from the frame, and the lever when so supported lying above the path of movement of a cam mounted on the countershaft 35. The free end of the lever is weighted and is also provided with a wear plate 45 adapted to rest upon the cam.

From the foregoing, it will be seen that, when the lever is allowed to rest upon the cam, it will be oscillated up and down, communicating such motion to the rod 40, which, through its pivotal connection with the sash, imparts thereto and to the emery wheel a vertical reciprocation. The reciprocation of the sash may be interrupted and the sash raised out of the path of the cam at any time, without disturbing the other mechanisms or cutting off the power, by merely raising the lever and causing the hook to engage and hold it in its elevated position. It is plainly evident, however, that the movement of a cam will always cause an oscillation bearing a certain relation to the operation of the other working parts of the machine and especially to the operation of the feeding mechanism. Hence since saw teeth are of different pitches and as it is ofttimes desirable to shape the teeth of different saws differently, it has heretofore been customary to provide a plurality of cams of different conformations corresponding to the different forms of saw teeth to be shaped and sharpened. Thus whenever it was desired to form saw teeth of a shape different from that permitted by the cam already in place, it was necessary to almost dismantle the machine in removing one cam and substituting another, thereby entailing considerable labor and great loss of time. I have, therefore, devised a means for economizing both time and labor as well as effecting a considerable reduction in the number of separate cams necessary to have on hand, to accomplish which results I have devised the following mechanism.

To the countershaft 35 I preferably secure a base plate or support 46 eccentric to the shaft and having a slot 47 formed therein, which slot may be arc shaped, if desired. A boss 48 forms a part of this plate and is provided with an apertured ear 48ᵃ projecting beyond the periphery of the plate and it may be at the thinnest point of the cam plate. Associated with this fixed plate is a disk or eccentric 49 having a hole therethrough of a size somewhat larger than the shaft, and opened as at 50 through the thinnest portion of the disk to permit the disk to be placed upon or removed from the shaft, the opening being of a width slightly larger than the diameter of the shaft and forming with the hole a recess eccentric to the disk. A bolt 51, or other suitable fastening means, passes through the slot 47 and into or through the cam 49 whereby the cam and eccentric plate are removably secured to each other and the cam caused to rotate with the plate.

In order to fill up the opening at 50 I provide a filling piece 52 curved to conform to the periphery of the cam 49 at that point, and forming a continuation thereof, said filling piece having an apertured lug 53 secured thereto preferably intermediate its ends and projecting laterally therefrom, a pin or bolt 54 passing through the ear 48ᵃ and through the lug, serving to retain the filling piece in position when the cam is secured to the plate.

Now it will be understood that several cams are kept in stock to vary the reciprocation of the grinding mechanism relative to the feed and thus obtain different forms of tooth. In order to reduce the number of cams necessary to be kept in stock, I utilize an adjustable connection between the cam and its plate, the same consisting of the bolt 51 and slot 47. By moving the bolt and the thereto attached or connected cam or eccentric 49, in the slot 47 the time of reciprocation of the grinding mechanism relative to the feeding mechanism will be changed, a scale 47ᵃ being provided adjacent the slot 47 to determine the amount of adjustment desired. Of course the movement of the cam relative to the plate can be through a comparatively small arc since the filling piece 52 is practically stationary with the plate, so that when an adjustment of the cam relative to the plate is made, the filling piece is tilted on its pin 54 to accommodate the limited adjustment of the cam. The change of adjustment or of the cams changes the time of contact of the grinding mechanism with the saw relative to the feed or travel of the saw and hence alters the shape of the teeth of such saw, but the reciprocation of the grinding mechanism remains the same for any given cam or an adjustment thereof.

Frequently, and particularly with reference to crosscut saws, it becomes necessary to bevel the teeth obliquely to the plane of the saw, and to accomplish this result I have devised the following mechanism embodying one form which my invention is capable of assuming.

Secured to the driven shaft 36 is a wheel 55 to which a side wiping cam 56ᵃ may be adjustably and removably secured at any desired point in its periphery. This side cam is designed to actuate the following mechanism.

A rocking lever 56 is pivotally secured intermediate its ends to a bracket 57 on the table, the lever extending above and below the table. To the upper end of the lever is pivotally secured one end of a rod 58 adjustable in length by means of a thimble 59, the opposite end of the rod being pivotally secured to a radius arm 60 carried by the stem 12 of the forked hanger, the arm projecting from the stem at a point between the arms of the yoke 10. That portion of the rocking lever beneath the pivotal point thereof is longitudinally slotted as at 61 for the reception of a stud 62 adapted to be adjusted at any point in the slot. Similarly pivoted intermediate its ends to the frame at a point beneath the pivotal point of the rocking lever 56, is a second rocking lever 63, the upper portion of which is longitudinally slotted as at 64 to receive the head of the stud 62. The upper end of the lever 63 supports an adjusting screw 65 which engages the head of the stud 62 and by means of which screw, the stud is adjusted in the slots 64 and 61. The lower end of lever 63 is provided preferably with an antifriction roll 65 lying in the path of movement of the wiping cam 56ᵃ so that upon each rotation of the wheel or disk 55, the cam will cause the levers 56 and 63, composing sections of a broken lever, to swing in one direction and thus move the rod 58 to swing the emery wheel to one side diagonally of the vertical plane of the saw, and by means of the rod adjustment (when necessary) and the stud adjustment, the throw of the lever 56 may be accurately and quickly determined, a scale 66 being provided on the lever 63. The throw or length of travel of lever 63 is always the same with any given side cam, but the time of such throw relative to the feeding mechanism and to the mechanism for reciprocating the emery wheel is determined by the position of the side cam on the disk 55. Also the length of travel of the upper end of lever 56 is determined by the position of the stud 62 in the slot 61 relative to the pivotal point of the lever.

The side cam 56ᵃ will move the levers 56 and 63 in one direction against the tension of a spring 63ᵇ one end of which is secured to the lever 63, the other end being secured to a bracket 63ᵃ supported upon the frame A. Thus when the cam 56ᵃ engages the lower end of lever 63 the lever is rocked against the tension of spring 63ᵇ and as soon as the cam leaves the lower end of the lever 63, the spring will swing the lever and its connected parts back to their original positions. This is however, but one of a number of means which I might employ to effect the twisting of the emery wheel.

It will be observed that the rotation of the disk 55 is much slower than the rotation of the adjustable cam on the countershaft. Hence, the vertical reciprocation of the grinding mechanism occurs oftener than the twisting movement thereof, and it is obvious that by changing the cam 56ᵃ and the time of rotation thereof any desired amount of beveling twist or shifting movement can be given the grinding mechanism, so that both sides of the tooth can be beveled or only one side, and the amount of bevel to be given the tooth can be changed by means of the screw adjustment connecting the levers, when the machine is in motion, the range of adjustment preferably being from zero degrees to forty-five degrees. I have also devised a novel means for supporting and feeding the saw, and while my invention can be embodied in other forms and arrangements of parts, I prefer the following. A disk 68 is journaled in any suitable manner (not shown) on the front of the frame, which disk, in the present instance, I have shown as a wheel, the periphery of which is grooved for the reception of a guide finger 69 secured to the frame and extending into the groove to maintain the wheel true. Extending preferably diametrically of the wheel is a dovetailed bar 70, the bar being conveniently of greater length than the diameter of the wheel, and having its front face recessed or cored out to receive a screw 71 extending longitudinally of the bar and passing through the ends thereof, the screw capable of rotation but incapable of lengthwise movement, a crank 72 being connected to one end of the screw for rotating the latter. A carriage 73 is slidingly mounted on the bar or rail and is engaged by the screw so that when the latter is rotated the carriage will be moved longitudinally of the rail. A mandrel 74 having the plates 75 and 76, is pivotally secured to the carriage, the saw adapted to be mounted on the mandrel between the two plates, where it is frictionally held to prevent an accidental rotation of the saw. The inner face of the disk may be equipped with spaced teeth or pins 77 designed to be engaged by a scroll 78 journaled to the frame and operated by means of a worm gearing 79, one member of which is secured to a suitably supported shaft 80 extending upward above the table, a crank 81 being secured to the shaft for the purpose of rotating the disk. By means of this construction a great advantage is gained over the prior art, since a universal adjustment is provided which so far as I am aware is unknown to prior constructions, wherein but two adjustments are possible. From the foregoing also it will be seen that the saw is always maintained in a vertical position while being acted upon by the grinding mechanism and the position of the center of the saw relative to the vertical plane through the center of the emery wheel may be altered to suit convenience and the style or shape of teeth desired, it being remembered that such vertical plane must always be in alinement with the vertical plane of the saw in order that the lowest point of the emery wheel may engage the saw.

When the saw is in position, a heavy spring arm 82 carried by the frame engages and bears against the outer face of the saw near its upper edge to hold it in contact with the head of an adjustable screw 83 also carried by the frame at a point directly beneath the grinding mechanism, for the purpose of preventing lateral movement of the upper edge of the saw during the operation of the grinding mechanism thereon.

A convenient mechanism for feeding the saw step by step to the grinding mechanism may be constructed as follows: A post 84 is pivotally secured at its lower end to the frame of the machine, the upper end of the bar projecting through a slot 85 in the frame, said upper end being cored out or recessed to receive a block 86 to the outer face of which is pivotally secured one end of the feed arm 87, the free end of which may be formed of some resilient metal if desired and provided with a laterally extending finger 88 normally resting on and guided by a flange 89 projecting from the table. The block 86 is adjustable in the recess 90 in the head of the bar, the head for this purpose carrying the adjusting screw 91 rotatably journaled in the head and prevented from longitudinal movement, the block 86 engaging the threads of the screw, whose opposite end is shown at 92.

An adjustable frame incloses the post, the frame comprising a U-shaped base portion 93 secured to the table at the edge of the slot 85, and a cap 94 adjustably connected to the ends of the U-shaped base by means of bolts or other fastening means 95, the adjustable frame designed to limit or prevent sidewise movement of the post, but permitting edgewise movement thereof. A bell crank arm 96 is secured to the bar preferably at a point beneath the table, one member of the arm being pivotally connected at its upper end to the bar and having preferably a V-shaped edge 97 for a purpose hereinafter set forth. The laterally extending member is provided with an arcuate slot 98 in which is received a bolt or other fastening means 99 mounted on the post and adapted to adjustably secure the bell crank so that the member carrying the V-shaped edge lies at more or less of an angle relative to the post. A bell crank lever 100 is loosely mounted on the driven shaft 36, one arm of the lever being preferably equipped with an antifriction roll 101 designed to engage the V-shaped edge 97 and run therealong. The opposite arm of the bell crank lever 100 is provided with a similar roll 102 adapted to lie against a cam 103 secured to the countershaft 35. From this description it will be seen that as one arm of the bell crank lever is rocked by the engagement of the cam 103 therewith, the other arm will be forced upward along the inclined edge of the cranked arm 96, causing the arm and post 84 to move forward thereby moving the feed finger forward to move the saw the space of one tooth. Such movement of the bar 84 operates to place a spring 104 under tension, one end of the spring being connected to the frame, and its opposite end being adjustably connected with a projection 105 on the post. The tension of the spring is sufficient to return the bar to its original position, the weight of the arm of the bell crank carrying the roll 101, causing the latter to drop as the post returns to such position.

It must, of course, be understood that the movements or operations of the various mechanisms heretofore set forth are synchronized relative to each other, and an acceleration of the friction drive will accelerate all the mechanisms simultaneously.

The operations of the various mechanisms have been hereinbefore set forth, but a short description of the operation of the machine as a whole follows: A circular rip or crosscut saw is first placed on the mandrel 74 and the same adjusted relative to the disk 68 and the disk adjusted, if need be, until the work is in position to be operated upon by the machine. Power is then applied to the machine and the hand lever 43 released from its hook and allowed to engage the cam 49, whereupon the sash is raised and lowered, bringing the rapidly rotating emery wheel 22, into contact with the saw teeth and raising it out of contact therewith, the emery wheel having a vertical reciprocation only, and in order that the lowest point of the emery wheel will always engage the saw in the vertical plane of the latter, the slide adjustment on the sash is provided. If it is desired that the teeth shall be beveled, the side wiping cam 56ª is applied to the wheel 55 at some portion of its periphery to cause the emery wheel to be moved into a diagonal position relative to the saw, either as it engages the saw or when it is about to be disengaged from the saw, as is desired. If no bevel at all is to be given the teeth, the cam 56ª is removed from the disk 55. The amount of bevel to be given the teeth is determined by the screw adjustment 65.

The feed mechanism is so arranged relative to the grinding mechanism that the finger 88 lies between two of the saw teeth, which preferably project just above the flange 89, and does not actuate the saw as the emery wheel is traveling into the throat thereof, but as the emery wheel ascends, the feed mechanism is actuated to move the saw one tooth and it is the degree of rapidity or speed with which the feed operates that determines the shape of the back of the tooth. A rapid feed will cause the grinding mechanism to form a straight backed tooth, while a slow feed will cause the grinding mechanism to form a long curved backed tooth. Obviously, the adjustment of the bell crank arm 96 relative to the rocking bar 84, and the cam 49 on the countershaft determine the style or shape of the tooth, and it may be observed that the slot 98 of the crank arm 96 is provided with a scale 106 for the purpose of facilitating its adjustment. Also, it will be obvious that the weight of the feeding arm and finger is borne by the flange so that no pressure is brought on the saw during the retraction of the feeding finger.

Unless a beveled face is desired, the saw and emery wheel are at right angles to each other, as when sharpening a rip saw for instance, and by shifting or changing cam 49, an increase or decrease of the time required to lift the emery wheel out of the throat of the saw teeth is effected, and the shape of the backs of the saw teeth is determined by either the adjustment of the cam 49, the crank arm 96, or both.

From the foregoing it is evident that many changes might be made in the form and arrangement of the several parts described without departing from the spirit and scope of my invention, and hence I do not limit myself to the precise construction herein set forth.

Having thus fully disclosed my invention, what I claim as new, is:—

1. In a saw sharpening machine, a vertically movable sash, transversely extending ways on the sash, a head slidingly received on the ways and projecting beyond the sash, a cutter-carrying member mounted in the projecting end of the head, and means connecting the head and sash for adjusting the head relative to the sash and maintaining its adjustment.

2. In a saw sharpening machine, the combination with a suitable support, of a forked hanger, an extended bearing on one arm of the forked hanger, a grinding arbor, one end of which is received and supported in the extended bearing, the opposite arm of the hanger being removable, a bearing screw received in the removable arm for supporting the free end of the arbor, and means for clamping the bearing screw.

3. A machine of the character disclosed, comprising a reciprocating sash, a rotary arbor supported by this sash, a pulley on the arbor, a drive pulley, a flexible connection between the pulleys, a belt tightening means located between the pulleys, said means comprising a bracket having a slot formed therein, a lever pivoted intermediate its ends to the bracket, a pin carried by the lever and received in the slot, and a pulley mounted on the lever, the belt passing over the pulley.

4. In a saw-sharpening machine, a work support, comprising a rotatable wheel, a way extending across the wheel, a carriage adjustable on the way, gearing for rotating the wheel, and stationary guiding means engaged by the wheel at points near its periphery for maintaining the support rigid.

5. A universal adjustment for work supports, comprising a pivotally mounted disk, a saw supporting carriage adjustably mounted on the disk, teeth carried by the disk, a scroll engaging the teeth, and means for actuating the scroll.

6. A universally adjustable work support for saw sharpening machines, comprising a rotatable wheel, having a groove formed therein, a guide finger extending into the groove, means for rotatably adjusting the wheel, and a saw supporting carriage adjustably mounted on the wheel.

7. A feed mechanism for saw sharpening machines, comprising a rocking post pivotally secured at its lower end, a feed arm pivotally connected to the upper end of the post, a bell crank lever, means for oscillating the lever, an approximately right angled bar, one end of which is pivotally and the opposite end adjustably secured to the post and engaged by the bell crank for moving the post in one direction, and means for moving the post in the opposite direction.

8. A machine for sharpening saws, comprising a frame having a slot formed therein, a rocking post extending through the slot, means for rocking the post, a feed arm connected to the post, and an adjustable frame inclosing the slot in the main frame, the adjustable frame comprising a base secured to the machine and lying on one side of the post, a cap lying on the opposite side of the post, and means passing across the opposite ends of the post for adjustably connecting the cap to the base.

9. A feed mechanism for saw sharpening machines, comprising a rocking post, a feed arm pivotally connected thereto, an angle arm, one end of which is pivotally secured to the post, the opposite end of the angle arm having a slot therein, means passing through the slot for adjustably securing the angle arm at any incline relative to the post, a pivotally supported bell crank, one arm of which engages the angle arm, and means for actuating the bell crank lever.

10. In a saw-sharpening machine, a main frame having a slot therein, a rocking post extending through and operating in the slot, means for rocking the post, and a feed-arm connected to the post, of a sectional frame adjustably secured to the main frame adjacent the slot and inclosing the rocking post, and means for adjusting one section of the frame relative to the remaining section and to the post.

In testimony whereof I affix my signature, in presence of two witnesses.

JOHN PATRICK HEDSTROM.

Witnesses:
 L. B. HANCHETT,
 H. J. HEYDENBURG.